(12) United States Patent
Hollub et al.

(10) Patent No.: US 6,206,055 B1
(45) Date of Patent: Mar. 27, 2001

(54) APPARATUS AND METHOD FOR REMOVING AND REPLACING VEHICLE HYDRAULIC FLUID

(76) Inventors: Peter C. Hollub, 1161 Pacific Cove La., Huntington Beach, CA (US) 92648; Harold J. Blanchard, 10637 E. Wrenwood La., Clovis, CA (US) 93611; Robert McLaughlin, 5174 E. Grant Ave., Fresno, CA (US) 93727

( * ) Notice: Subject to any disclaimer, the term of this patent is extended or adjusted under 35 U.S.C. 154(b) by 0 days.

(21) Appl. No.: 09/415,851

(22) Filed: Oct. 7, 1999

Related U.S. Application Data

(60) Provisional application No. 60/103,527, filed on Oct. 8, 1998.

(51) Int. Cl.⁷ .................................................. B65B 1/04
(52) U.S. Cl. .................... 141/98; 141/65; 184/1.5
(58) Field of Search ................... 141/98, 65, 67, 141/285, 59; 184/1.5

(56) References Cited

U.S. PATENT DOCUMENTS

| | | | |
|---|---|---|---|
| 4,193,487 | * 3/1980 | Takeuchi | 184/1.5 |
| 4,772,402 | 9/1988 | Love . | |
| 5,021,152 | 6/1991 | Filowitz . | |
| 5,318,700 | 6/1994 | Dixon . | |
| 5,410,881 | 5/1995 | Ellis . | |
| 5,415,247 | * 5/1995 | Knorr | 184/1.5 |
| 5,429,753 | 7/1995 | Hilgren . | |
| 5,447,184 | * 9/1995 | Betancourt | 141/98 |
| 5,472,064 | * 12/1995 | Viken | 184/1.5 |
| 5,497,864 | 3/1996 | Oien . | |
| 5,569,389 | 10/1996 | Hilgren . | |
| 5,593,596 | 1/1997 | Bratten . | |
| 5,597,601 | 1/1997 | Griffin . | |

* cited by examiner

*Primary Examiner*—Steven O. Douglas
(74) *Attorney, Agent, or Firm*—Richard A. Ryan

(57) ABSTRACT

An apparatus and method for removing, flushing contaminants from and replacing vehicle brake fluid. The apparatus has storage tanks for fresh and waste hydraulic fluid, a fill pump to pump hydraulic fresh hydraulic fluid to the vehicle braking system, an adapter for sealably connecting a fill hose to the master cylinder, a suction pump to suction used hydraulic fluid from the vehicle braking system to the waste fluid tank, a suction hose for suctioning fluid out of the master cylinder and hoses for connecting the waste fluid tank to the bleeder valves located at the vehicle wheels. A by-pass valve is provided between the fill pump and master cylinder to by-pass fluid when the fill hose reaches or exceeds a predetermined level. A computer and ancillary electrical and fluid connections between the various parts of the apparatus and the hydraulic fluid system of a vehicle are also utilized. The apparatus can also be used when replacing the master cylinder or when replacing fluid in other hydraulic systems (i.e. hydraulic clutch).

22 Claims, 6 Drawing Sheets

APPARATUS AND METHOD FOR REMOVING AND REPLACING VEHICLE HYDRAULIC FLUID

CROSS-REFERENCE TO RELATED APPLICATIONS

This application claims the benefit of U.S. Provisional Patent Application No. 60/103,527 filed Oct. 8, 1998.

BACKGROUND OF THE INVENTION

A. Field of the Invention

The present invention relates to a system and method for removing and replacing vehicular hydraulic fluid. In particular the present invention relates to an apparatus for removing and replacing the hydraulic brake fluid used in the brake system of an automobile, truck, recreational or other vehicle which flushes the hydraulic system of contaminants such as air, water and particulates. Significantly, the present system and method can be carried out as a substantially closed system.

B. Background

Modern motor vehicles have internally-expanding, hydraulically operated brakes. Hydraulic actuation is based on the principle that a pressure exerted upon a liquid is transmitted uniformly in all directions. The typical vehicle brake system comprises a main or master cylinder with a reserve fluid tank, wheel cylinders and connecting brake lines or pipes. Application of the brakes, by depressing the brake pedal, causes a piston in the master cylinder to move and displace hydraulic brake fluid stored in the master cylinder to cause the brake fluid to move through the brake lines. The displaced brake fluid transmits pressure through the fluid filled brake lines to the wheel cylinders that actuate the brake shoe or pad. As a result, the brake shoes or pads are thrust against a brake drum to stop the vehicle's wheels. A pump can be used to increase braking capacity.

Brakes pads, shoes or discs apply a force to particular components, such as the brake drums or rotors that rotate with the wheels. As much as 2,000 pounds psi of hydraulic pressure may be exerted by the brakes on each of the four wheels to stop the vehicle. Brake fluid also acts as a lubricant for the pistons, cylinders, seals and valves that make up the brake system. Different brake systems use different types of brake fluid. All of the brake fluids have certain desirable characteristics and negative aspects. Desirable brake fluid characteristics of brake fluids include high boiling temperature, low freezing temperature and low tendency to bubble. The purity of the brake fluid is important, because if it becomes contaminated the piston seals, hoses and other parts of the brake system may be damaged and have to be replaced. A negative aspect of brake fluid is that it is corrosive to paint and its spillage can harm a vehicle's exterior finish. In addition, inhalation of brake fluid fumes presents a health hazard and spillage of brake fluid presents potential environmental concerns.

Common vehicular brake fluids have ratings such as DOT (Department of Transportation) 3, 4 or 5. DOT 3 brake fluid is recommend for normal city driving, DOT 4 for mountain, trailer towing or frequent hard braking use and silicone based DOT 5 brake fluid for performance or racing vehicles. The higher the DOT rating the higher the boiling point of the brake fluid. However, the higher the boiling point of the brake fluid, the more hygroscopic or water absorbing the brake fluid tends to be. As water is absorbed by the brake fluid its boiling point becomes lower. For instance, a brake fluid having a 3% water content can have a boiling temperature that is 25% lower than a water-free brake fluid. Additionally, at low temperatures the water absorbed by the brake fluid can form ice crystals, which impede free flow of the brake fluid. Thus, the presence of water in the brake fluid can cause a lower boiling point and ice to form, both of which can impair brake function. Even without the problems caused by extreme temperatures, water absorbed by the brake fluid can cause brake components to prematurely rust and fail. Generally, automotive brake fluid should be replaced and the brake system flushed of contaminants when the water level in the brakes fluid is about 3% by volume.

Most brake fluids are clear, volatile, water soluble liquids comprised of a mixture of several alcohols such as glycols. Silicone based (DOT 5) brake fluids are also known. Through use brake fluid can become discolored due to contamination from dirt and disintegrating rubber seals. Additionally, oxygen in the air can oxidize the brake fluid which also reduces its boiling point. Due to its volatile nature and easily absorbed constituents, inhalation of and/or contact with brake fluid can be hazardous.

A lower brake fluid boiling point can result in the brake fluid boiling during a long downhill stretch of intermittent braking. If the brake fluid boils the resulting bubbles reduce brake effectiveness and causes brake fade ("soft brakes") due to the gas bubbles absorbing foot pressure instead of transmitting it through the brake fluid. Particulate matter, such as airborne dust and rubber seal fragments, can also collect within the fluid filled brake lines and reduce braking effectiveness.

To remove water and contaminants, the brake fluid is periodically replaced with new brake fluid. The drained brake fluid is not reused because once exposed to the atmosphere, even if only for a brief period, significant amounts of water, air (with the oxidizing oxygen) and contaminants such as dust can be absorbed by the brake fluid. Even new brake fluid exposed to ambient air can absorb moisture resulting in an immediate loss of the brake fluid's effectiveness. Brake fluid can be tested to determine its viability, such as determining its water content by the method and apparatus disclosed by U.S. Pat. No. 5,028,144. The '144 patent, however, does not disclose an apparatus for removing or replacing spent brake fluid.

As described above, hydraulic brake fluid is periodically replaced due to fluid deterioration and contamination. Many brake fluids have volatile and/or toxic components which can hinder removal and replacement of the fluid. Typically, the entire hydraulic fluid is drained from the brake system and replaced with new fluid, the process being carried out in an open air environment whereby the fluid is exposed to the atmosphere as the brake system is being drained and new fluid is added. Unfortunately, this method releases pollutants into the air and exposes the operator to harmful fluids and vapors. Additionally, no attempt is made to recycle or reuse any of the hydraulic fluid resulting in economic waste and fluid disposal problems. In fact, some states have imposed a fee for the collection and disposal of used brake fluid from automotive service centers, which is typically collected into open containers.

Whether it is necessary to remove and replace the brake fluid is typically determined solely by examining the color of the brake fluid or by automatic replacement after a predetermined period (i.e., after 18 to 24 months or after every 30,000 miles of vehicle usage). If desired, a brake fluid water content test can be done quickly utilizing currently available technology. For instance, brake fluid test strips available from Wagner can be inserted into a vehicle's brake fluid to determine both the type of brake fluid being used and its relative water content. The test is performed much like a pH test in that the a test strip is inserted into the hydraulic fluid and visually reviewed to determine the type of brake fluid and whether the water content is too high. The test method uses samples taken from either the master cylinder or a brake cylinder. The above-described brake fluid test can be run quickly, typically taking less than 1 minute.

The prior art method of replacing brake fluid takes two people about 45 minutes to an hour to remove and replace the brake fluid. The prior art method also requires additional time to clean-up the resulting spillage that is essentially inherent in the prior art method. One commonly known method for removing and replacing a vehicle's hydraulic brake fluid and then removing air introduced into the brake lines by this two person, open system method is shown in FIGS. 1 and 2. Typically, about twice the volume of fluid the caliper can hold per wheel is used by the prior art method. Unfortunately, new brake fluid can become contaminated with moisture, air and particulates as soon as the brake fluid container is opened and poured into the brake system due to the typical open system method used to flush and replace used brake fluid.

What is needed therefore is an apparatus and method for safely removing and replacing hydraulic fluid without exposing the environment or the operator to the brake fluid. Also needed is an apparatus and method for flushing a hydraulic system of contaminants such as air, water and particulates and for safely storing and using new brake fluid while minimizing problems with the removal and disposal of waste brake fluid.

SUMMARY OF THE INVENTION

The apparatus and method for removing and replacing hydraulic fluid without exposing the environment or the operator to the hydraulic fluid of the present invention solves the problems identified above. That is to say, the present invention provides an apparatus and method for flushing fluid from a hydraulic system to remove contaminants such as air, water and particulates and for filling the system with new brake fluid while minimizing problems with the removal and disposal of the used brake fluid.

The present invention is based upon the concept that brake fluid can be removed and replaced and the brake system flushed of contaminants while maintaining a closed system. Because brake fluid is hygroscopic, the absorption of moisture lowers the boiling point of the brake fluid and causes premature degradation of the fluid and increased likelihood of corrosion in the brake system. Additionally, exposure of an operator to the brake fluid presents health hazards. Therefore, the apparatus of the present invention operates as a closed system.

An apparatus within the scope of the present invention comprises a closed system with fluid pumps, a flow meter, a computer and ancillary electrical connections between the various parts of the apparatus and fluid pipe connections between the apparatus and the hydraulic fluid system of a vehicle. The function of the computer is to control pressures and fluid levels. For safety and operational reasons, the computer should shut down the apparatus if the new fluid tank is or becomes empty and if the waste fluid tank is or becomes full.

The present invention is used to remove a vehicle's hydraulic brake fluid, flush and capture contaminants from the brake system and replace the brake fluid. The invention facilitates replacing brake fluid having an unacceptable level of water content with new brake fluid without exposing the new brake fluid to air and without requiring the operator to handle or be exposed to the waste brake fluid. As such, the apparatus of the present invention differs from known apparatus by use of a closed system to prevent exposure of brake fluid to the environment and to prevent exposure of air to the brake fluid system and to the new brake fluid.

The fresh fluid system of the invention has the following benefits: (1) provides a reliable and sealed method of pumping brake fluid; (2) connects to all major types of master cylinders & reservoirs; (3) provides an automatic shutoff if reservoir is full; (4) permits the brake fluid to travel up to 25 feet with a 10 foot rise in elevation; and (5) has a working pressure of 5 to 12 psi.

Therefore, it is a primary objective of the present invention to provide an apparatus for easily, quickly and relatively inexpensively removing a vehicle's hydraulic brake fluid and replacing it with new brake fluid without exposing the brake fluid to the environment and the service personnel to the brake fluid.

It is another primary objective of the present invention to provide an apparatus for removing and replacing a vehicle's hydraulic brake fluid that utilizes a system to remove spent brake fluid from a vehicle to a closed container while re-filing the brake system with new brake fluid from a closed container.

It is another objective of the present invention to provide an apparatus comprising a pump, various fluid control and measuring devices, fluid tanks and an electronic control mechanism to easily and quickly remove and replace vehicle brake fluid in a closed system.

It is yet another objective of the present invention to provide a method for removing and replacing a vehicle's hydraulic brake fluid without exposing the old or new fluid to the environment or to persons operating the apparatus of the present invention.

The above and other objectives of the present invention will be explained in greater detail by reference to the attached figures and the description of the preferred embodiment which follows. As set forth herein, the present invention resides in the novel features of form, construction, mode of operation and combination of parts presently described and understood by the claims.

BRIEF DESCRIPTION OF THE DRAWINGS

In the drawings which illustrate the best modes presently contemplated for carrying out the present invention.

DETAILED DESCRIPTION

Figure 1:
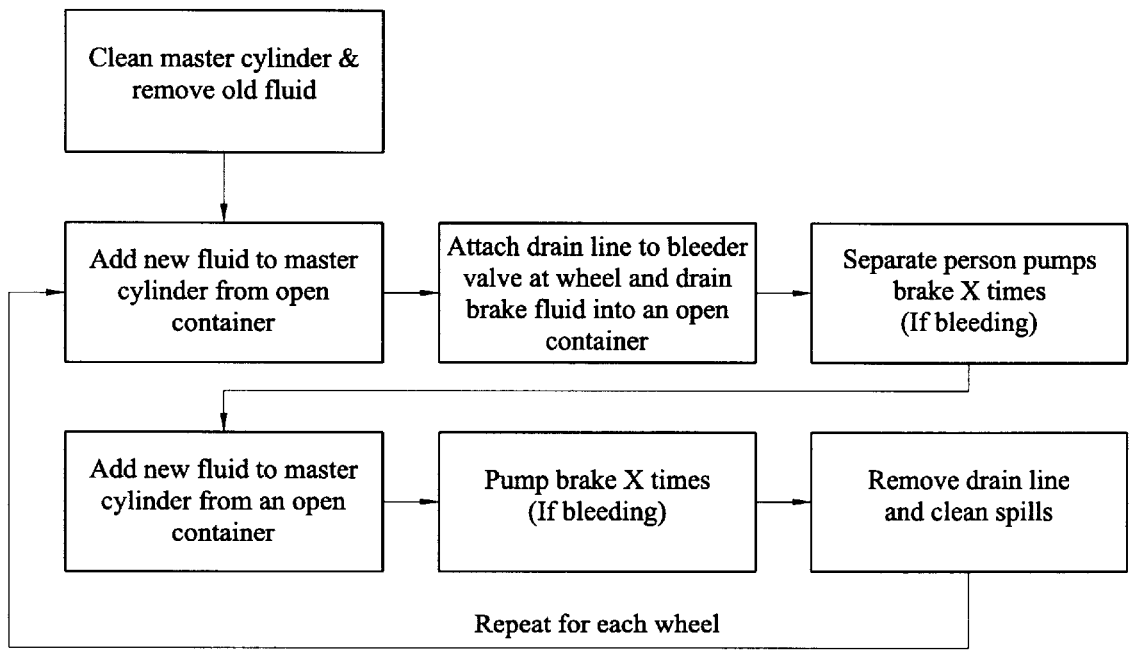
FIG. 1 is a flow chart of a prior art method for removing and replacing automotive brake fluid.
Figure 2:
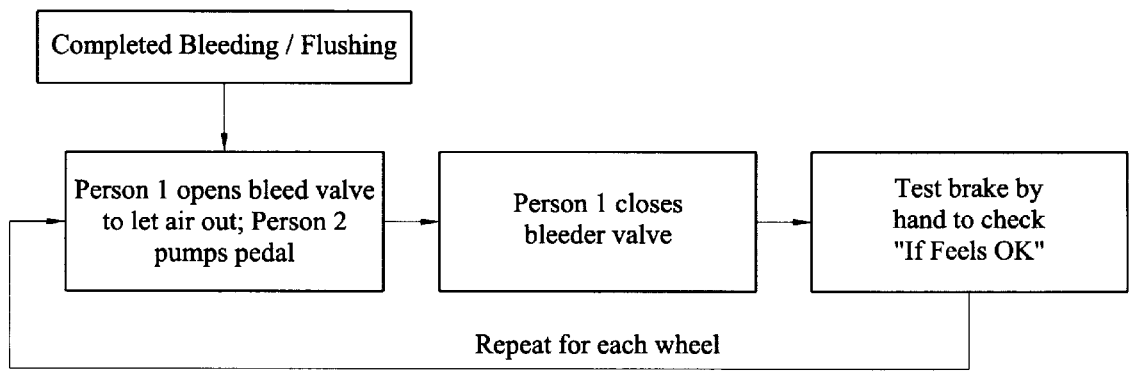
FIG. 2 is a flow chart of a prior art method for removing air from an automotive brake fluid system after removing and replacing the brake fluid by the method shown in FIG. 1.
Figure 3:
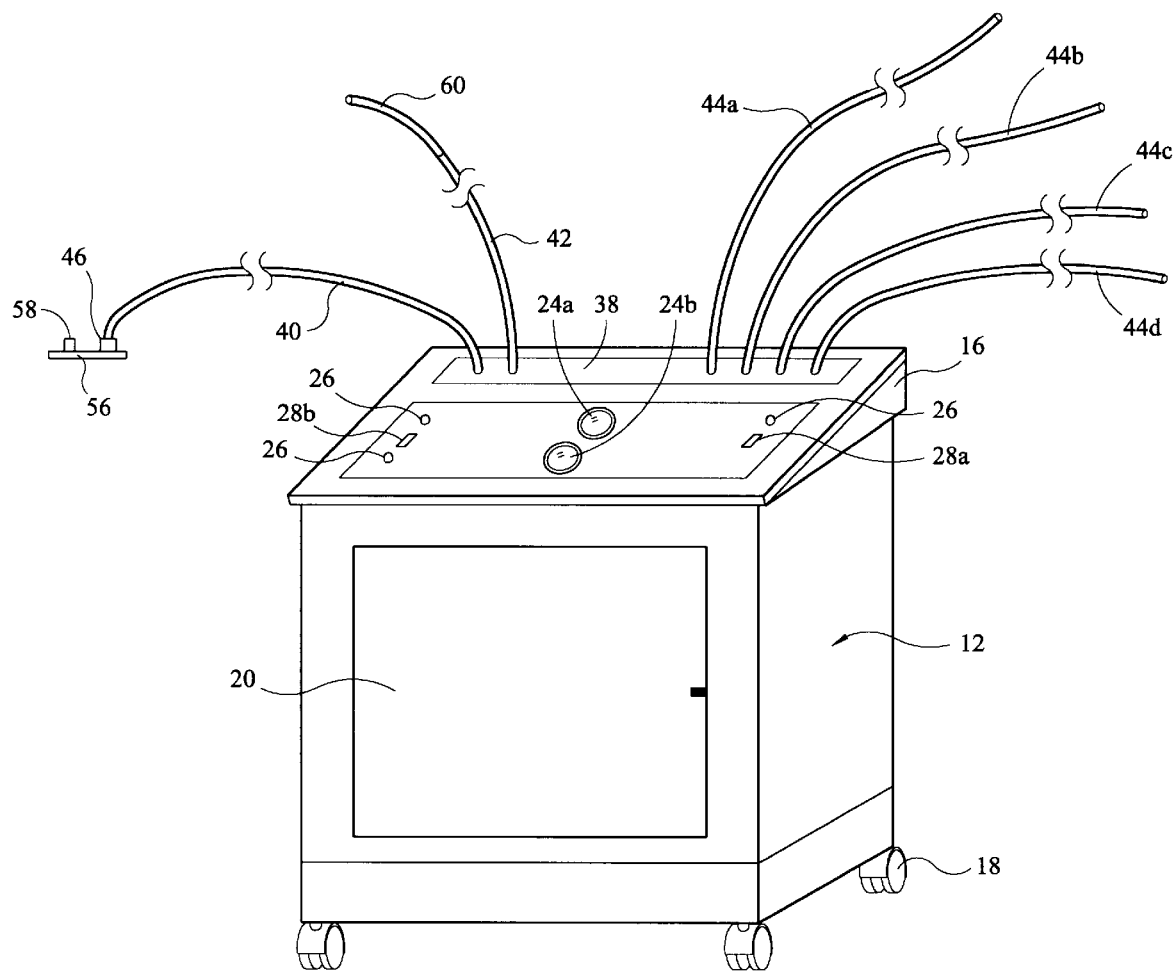
FIG. 3 is a perspective view of an embodiment of the present invention.
Figure 4:
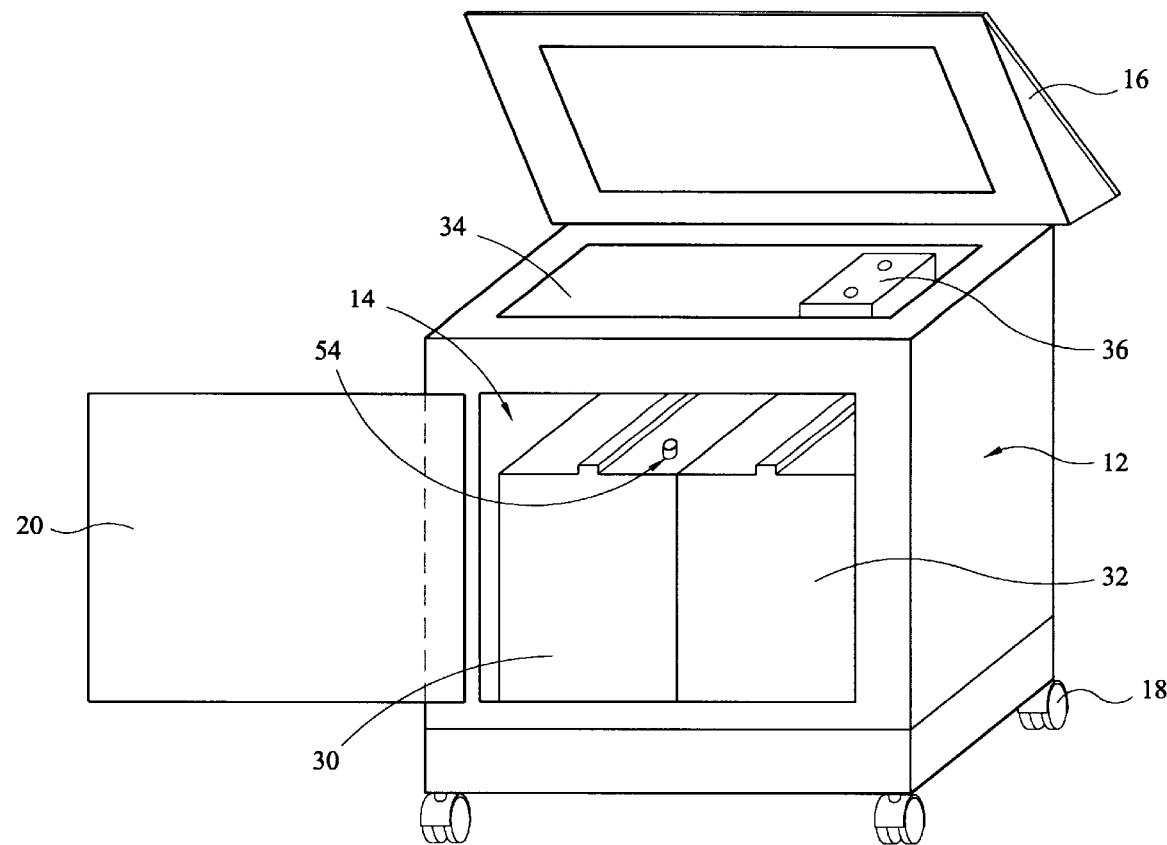
FIG. 4 is a front side view of the embodiment of the present invention shown in FIG. 3 with the doors and cabinet top open.

With reference to FIGS. 3 through 8, where like elements have been given like numerical designations to facilitate understanding of the present invention, the vehicle brake fluid removal and replacement apparatus of the present invention is designated generally 10. Illustrated in FIG. 3 is a perspective view of an embodiment of the present invention showing a brake flushing system 10 comprising a roll-away system cart 12 forming an enclosed housing 14, a cabinet top 16, locking casters 18 for easy positioning and placement of the cart, and door 20. The brake fluid flushing apparatus 10 is all contained in cart 12 to allow easy positioning in and movement around an automotive shop. A preferred cart 12 size is about three feet high by about two and one half feet wide by about sixteen inches deep. Generally, due to work conditions, the maximum comfortable height for cart 12 is about four feet.

Cart 12 also includes control panel 22 on cabinet top 16, pressure gauges 24a and 24b, indicator lights 26 and switches 28a and 28b. In the preferred embodiment, the apparatus 10 utilizes fresh fluid tank 30 for storage of fresh (new) brake fluid and waste fluid tank 32 for the storage of waste brake fluid. For convenience purposes, cart 12 can also include storage area 34 under a raisable cabinet top 16 for the storage of master cylinder adapters and bleeder valve connectors to be used with the present invention 10 and for the power supply (i.e., a 110 volt AC or 12 volt battery). Also part of cart 12 is hose tray 38 from which the fill hose 40, vacuum hose 42 and the four bleeder valve hoses 44a, 44b, 44c and 44d (collectively 44) extend. When not in use, the hoses can be stored under hose tray 38.

Additional components of the present invention 10 include a master cylinder connector 46, a peristaltic pump (or fill pump) 50, a diaphragm or impeller pump (or vacuum pump) 52, one air inlet valve 54 on fresh fluid tank 30, master cylinder adapter 56, air vent 58 on the master cylinder adapter 56, a vacuum wand 60, by-pass valve 62, switch valve 64 and various control electronics, switches, hoses and indicators.

Figure 5:
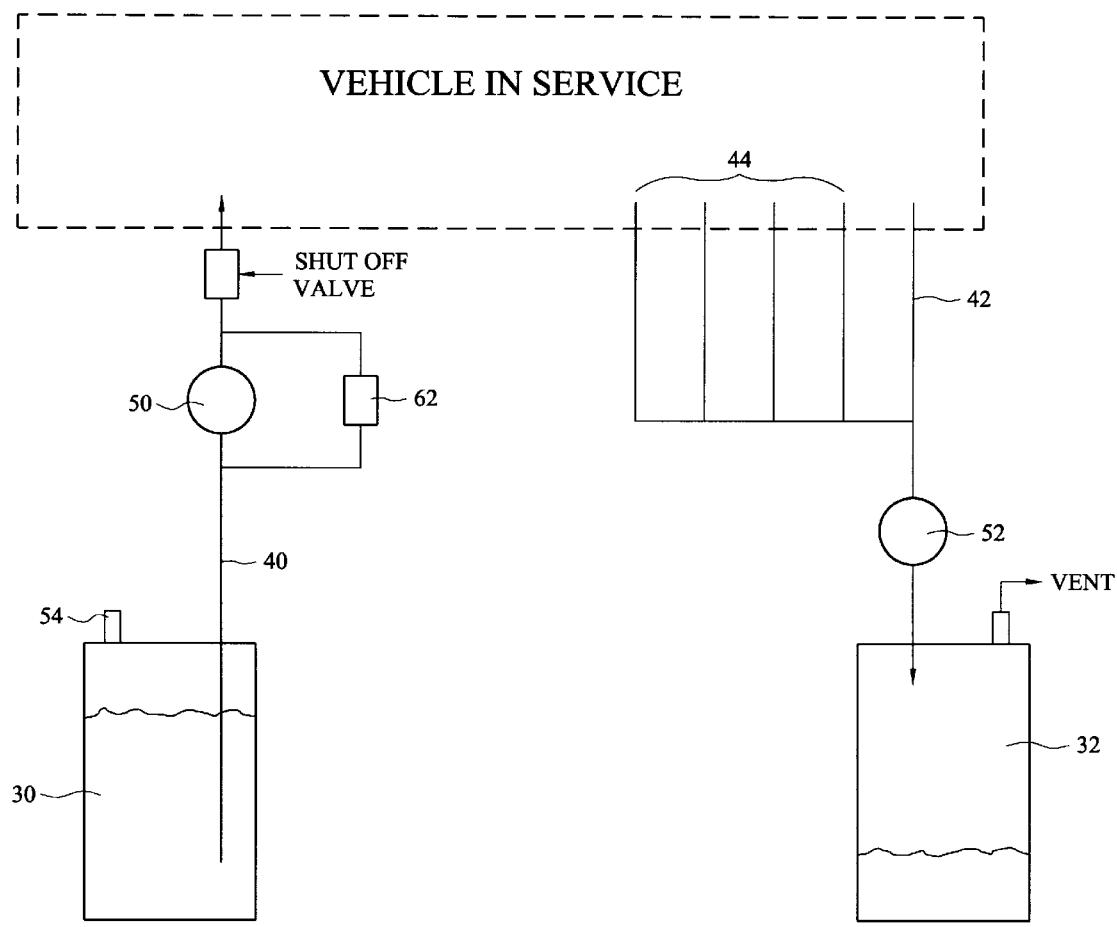
FIG. 5 is an overall schematic of the apparatus of the present invention shown in FIG. 3.
Figure 6:
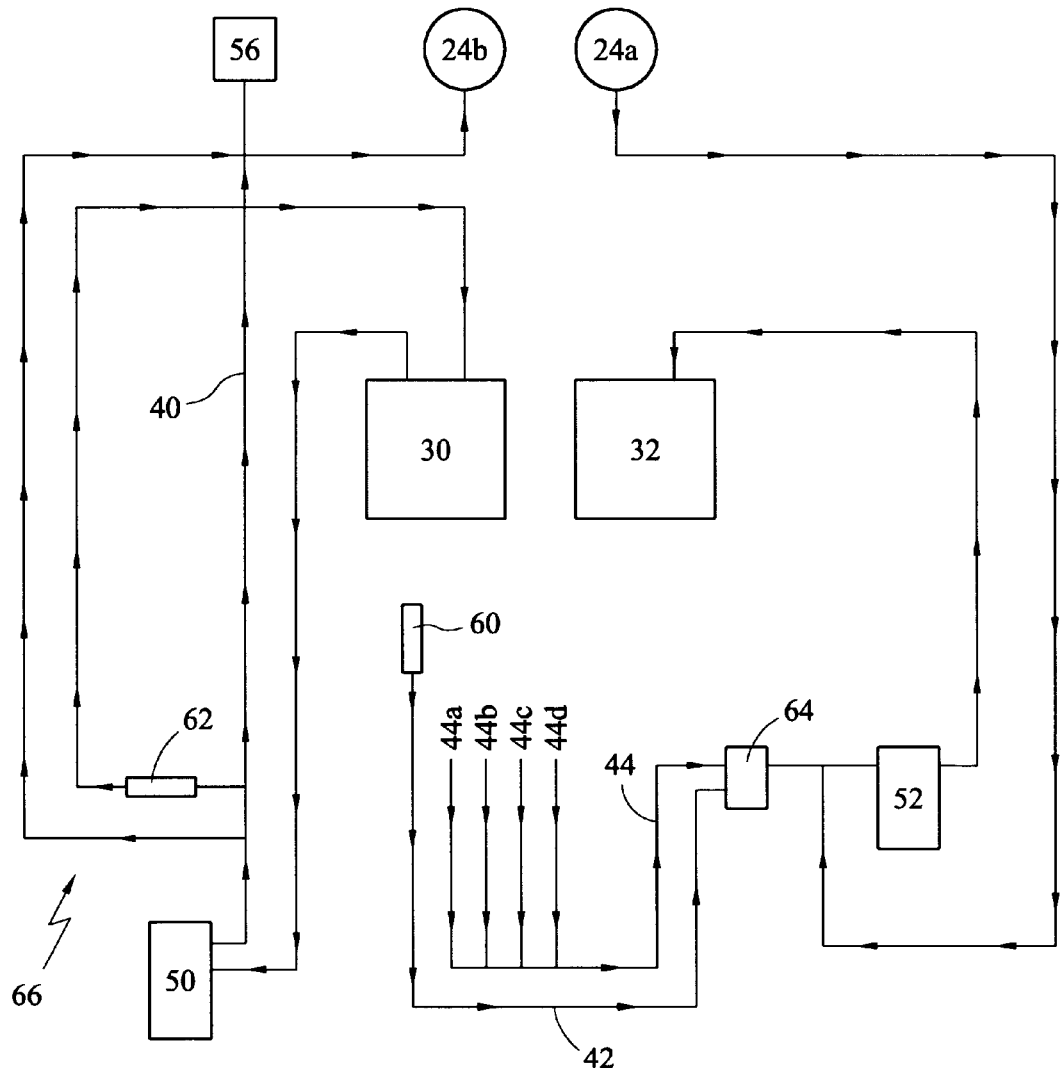
FIG. 6 is a schematic of the hose system of the apparatus of the present invention shown in FIG. 3.

As set forth above and in the schematic drawing of the present invention in FIGS. 5 and 6, there are two primary components in the fluid transfer system of the present invention 10, the fresh fluid system 66 and the scavenge/waste system 68. The fresh fluid system 66 pumps fresh fluid into the master cylinder or reservoir of the automobile. The scavenge/waste system 68 vacuums brake fluid from the master cylinder and all four brake cylinders and transfers it to waste fluid tank 32. The primary components of the fresh fluid system 66 are the fress fluid tank 30, the peristaltic (fill) pump 50, the by-pass valve 62 and fill hose 40. The primary components of the scavenge/waste fluid system 68 are the waster fluid tank 32, vacuum pump 32, switch valve 64, vacuum hose 42 and the bleeder hoses 44.

Ideally, the fresh fluid tank 30 should be able to store brake fluid for long periods of time (i.e., up 3 months) without exposing it to air or moisture, resulting in deterioration of the brake fluid. Additionally, the fresh brake fluid system 66 must deliver brake fluid to the master cylinder without introducing air and contaminants into the vehicle brake system. The fresh fluid tank 30 should also easily connect to the apparatus of the present invention and be reusable for waste fluid to minimize waste and enhance safety procedures. As such, both fluid tanks 30 and 32 should be UN/DOT (United Nations/Department of Transportation) approved for shipping waste fluids to a disposal location.

In the preferred-embodiment, fresh fluid tank 30 is a UN/DOT approved shippable container that can, when full, contain five gallons of fresh brake fluid. The fluid tank 30 can safely store the fluid without leakage or exposure to air. The container should also have a mechanism to prevent connection of the waste fluid tank 32 to the fresh fluid inlet (i.e., fill hose 40).

The various connectors 46 and 48 and adapter 56 are the interfaces between the brake fluid stored in cart 12 and the automobile being worked on. Master cylinder adapter 56 connects to the master cylinder or fluid storage reservoir of the automobile to provide for the ingress of fresh brake fluid from fresh fluid tank 30 in cart 12 through fill hose 40. The master cylinder connector 46, which can be a standard quick release connector, connects to the master cylinder adapter 56. Four bleeder valve hoses 44 are connected to the bleeder valves on the brake cylinders at each wheel. In the preferred embodiment, the end of hose 44 itself is placed onto or over the bleeder valve. Alternatively, a separate connector can be used.

The fluid level in the master cylinder must be maintained to eliminate air or other contaminants from getting into the system. Mounted in the master cylinder adapter 56 is a vent valve 46 for avoiding air-lock by allowing air to exit the master cylinder, but not hydraulic fluid, during filling. One type of vent valve 46 that can be used is the Maxivent™ from Aquitrol, Inc., which utilizes a polypropylene float. The master cylinder adapter 56 should be designed to be a universal adapter that can be used to connect to the master cylinder or to the brake fluid reservoir of most automobiles and provide a 25 psi seal. Adapter 56 also has a rubber protrusion in the seal that facilitates proper filling of the fluid reservoir.

The fresh fluid system 66 uses a peristaltic pump 50, to help eliminate foaming of the brake fluid, connected to fresh fluid tank 30. Tank 30 should be configured such that as fluid is pumped out air is prevented from entering the flushing system and exposing the brake fluid to the air and contaminants. Air inlet valve 54 on tank 30 allows the peristaltic pump 50 to pump out the fresh fluid without collapsing tank 30. The air inlet valve 54 should be a desiccant valve for removing moisture from the air. The user has no direct contact with the brake fluid, which stays within the hose.

In the preferred embodiment, the fill pump 50 and the scavenge/waste pump 52 both operate on 12 volts or 110 volts, can withstand up to 25 psi back pressure, operate without significant frothing of the brake fluid, are chemically resistant to the brake fluid, have a 0.25 to 1 GPM (gallons per minute) flow rate and are self priming.

The scavenge/waster fluid system 68 removes the brake fluid from the four bleeder valves and routes it into the waste fluid tank 32. One line of the scavenge system, the vacuum hose 42, connects to a vacuum wand 60 to allow easy cleaning of the master cylinder reservoir. The bleeder valve hoses 44 should be transparent so as to provide visible indication of whether used or new brake fluid is exiting the bleeder valves. The bleeder valve connectors 48 should be configured to connect to the standard vehicle bleeder valves located at each wheel of a vehicle.

Figure 7:
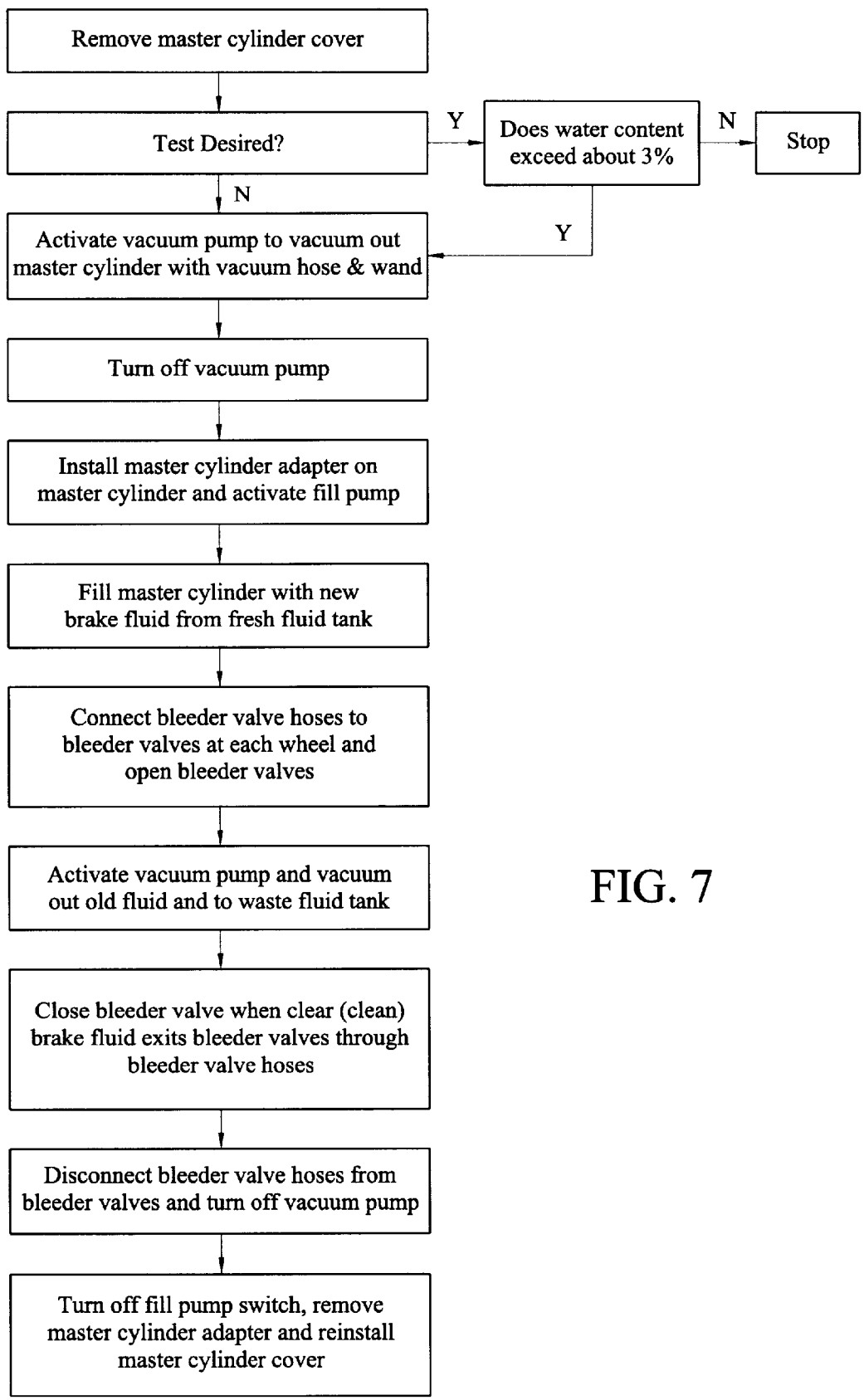
FIG. 7 is a flow chart of a method within the scope of the present invention.

The operation of the apparatus of the present invention is illustrated in FIG. 7 and described below. After removing the cover of the master cylinder and testing the brake fluid, if desired, switch 28b is turned on to activate vacuum pump 52 and create a vacuum in vacuum hose 42. Vacuum wand 60, attached to vacuum hose 42, is utilized to remove used brake fluid from the master cylinder and any particulate matter that has accumulated therein and dispose of it in the waste fluid tank 32. Vacuuming out the master cylinder saves time because less fluid has to be forced through the brake system. Vacuuming out the master cylinder also avoids the potential of mixing new brake fluid with old brake fluid and of forcing particulate matter through the brake lines. After the master cylinder is vacuumed out, switch 28b is turned to the off position and vacuum hose 42 is returned to cart 12.

Master cylinder adapter 56, with fill hose 40 attached thereto, is installed on the master cylinder. With master cylinder adapter 56 in place, the master cylinder fill switch 28a is turned to the on position and the master cylinder is filled with new brake fluid from the fresh fluid tank 30. When the pressure in the fill line reaches a pre-determined level (i.e., 10 psi) by-pass valve 62 is automatically activated in apparatus 10 to by-pass brake fluid until it is needed for filling the brake lines. While the master cylinder is filling, the vehicle can be raised for ease of vacuuming and filling the brake system. One of the four bleeder valve hoses 44 leading from the waste fluid tank 32 is connected to one of the four bleeder valves (one hose 44 for each valve) on the vehicle's wheel master cylinder.

After the bleeder valve hoses 44 are installed, switch 28b at cart 12 is turned to start vacuum pump 52 and vacuum the old fluid out of the brake lines and into waste fluid tank 32. A sensor connected to the waste fluid tank 32 ensures that waste fluid tank 32 is not overfilled. The reduction in pressure in the brake lines releases the by-pass and new fluid begins flowing through the master cylinder into the brake lines. The bleeder valves at each of the wheels are closed when clear fluid starts passing through the bleeder valves and into the transparent bleeder valve hoses 44.

When the bleeder valves are shut-off, the by-pass valve 62 in apparatus 10 will begin by-passing the new fluid again (i.e., when the pressure in reaches 10 psi). The bleeder valve hoses 44 are disconnected from the bleeder valves at each wheel, the vacuum pump 52 is shut-off and the vehicle is lowered. At the completion of the process, the master cylinder fill switch 28a is turned off, the master cylinder adapter 56 is removed from the master cylinder and the master cylinder cover is reinstalled. Throughout the filling and removal operation described above, a closed system is maintained.

The air vent/float sensor 58 incorporated into master cylinder adapter 56 vents the air to prevent air-lock. Pressure gauge 24a indicates the pressure of brake fluid in the master cylinder and vacuum gauge 24b indicates the amount of vacuum being drawn by vacuum pump 52.

A typical volume of brake fluid exchange is one to two quarts. With the present invention 10 it takes approximately ten to fifteen minutes to remove the waste brake fluid and replace it with new brake fluid. Unlike the prior art method of replacing brake fluid, the present invention does not require any bleeding of the brake lines or clean-up after installing the new brake fluid. The present invention 10 can also be used when a new master cylinder has to be installed. With the present invention 10, the need for bench bleeding of the master cylinder is eliminated. Another use for the present invention is with vehicles having a hydraulic clutch system. Because hydraulic clutch systems utilize the same hydraulic fluid, the same apparatus can be used with the same fluids.

While there is shown and described herein certain specific alternative forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to the dimensional relationships set forth herein and modifications in assembly, materials, size, shape, and use. For example, a wide variety of cart configurations are possible.

What is claimed is:

1. An apparatus for removing and replacing hydraulic fluid used in a hydraulic fluid system in a vehicle, comprising:
   a housing;
   a fresh fluid tank in said housing for storing a source of fresh hydraulic fluid for use in the vehicle;
   a waste fluid tank in said housing for receiving and storing a source of waste hydraulic fluid received from the vehicle;
   a fill pump for dispensing hydraulic fluid from said source of fresh hydraulic fluid to the hydraulic fluid system in the vehicle through a fill hose interconnecting said fresh fluid tank and the hydraulic fluid system;
   an adapter disposed between said fill hose and the hydraulic fluid system for removably connecting said fill hose to the hydraulic fluid system, said adapter sized and configured to sealably connect to a vehicle brake master cylinder in the hydraulic fluid system of the vehicle;
   a vacuum pump for suctioning hydraulic fluid from the hydraulic fluid system of the vehicle to said waste fluid tank through one or more bleeder valve hoses interconnecting the hydraulic fluid system and said waste fluid tank; and
   connection means at an end of each of said one or more bleeder valve hoses for removably connecting each of said one or more bleeder valve hoses to a bleeder valve on the vehicle.

2. The apparatus according to claim 1, wherein said adapter comprises a vent for preventing air-lock in said hydraulic fluid storage reservoir, said vent configured to allow air to escape from said storage reservoir during dispensing of hydraulic fluid to the hydraulic fluid system.

3. The apparatus according to claim 1 further comprising a suction hose connected to said vacuum pump for suctioning hydraulic fluid from the hydraulic fluid system to said waste fluid tank.

4. The apparatus according to claim 3, wherein said suction hose comprises a suction wand at one end of said suction hose for suctioning hydraulic fluid from the hydraulic fluid system.

5. The apparatus according to claim 1 further comprising a by-pass valve disposed between said fill pump and said hydraulic fluid system to by-pass hydraulic fluid when the pressure in said fill hose exceeds a predetermined level.

6. An apparatus for removing and replacing hydraulic fluid used in a hydraulic fluid system in a vehicle, comprising:
   a housing;
   a fresh fluid tank in said housing for storing a source of fresh hydraulic fluid for use in the vehicle;
   a waste fluid tank in said housing for receiving and storing a source of waste hydraulic fluid received from the vehicle;
   a fill pump for dispensing hydraulic fluid from said source of fresh hydraulic fluid to the hydraulic fluid system in the vehicle through a fill hose interconnecting said fresh fluid tank and the hydraulic fluid system;
   an adapter disposed between said fill hose and the hydraulic fluid system for removably connecting said fill hose to the hydraulic fluid system;

a vacuum pump for suctioning hydraulic fluid from the hydraulic fluid system of the vehicle to said waste fluid tank through one or more bleeder valve hoses interconnecting the hydraulic fluid system and said waste fluid tank;

connections means at an end of each of said one or more bleeder valve hoses for removably connecting each of said one or more bleeder valve hoses to a bleeder valve on the vehicle; and a suction hose connected to said suction pump for suctioning hydraulic fluid from a vehicle brake master cylinder in the hydraulic fluid system of the vehicle to said waste fluid tank.

7. The apparatus according to claim 6, wherein said adapter is sized and configured to sealably connect to said hydraulic fluid storage reservoir.

8. The apparatus according to claim 6, wherein said adapter comprises a vent for preventing air-lock in said hydraulic fluid storage reservoir, said vent configured to allow air to escape from said storage reservoir during dispensing of hydraulic fluid to the hydraulic fluid system.

9. The apparatus according to claim 6, wherein said suction hose comprises a suction wand at one end of said suction hose for suctioning hydraulic fluid from the hydraulic fluid system.

10. The apparatus according to claim 6 further comprising a by-pass valve disposed between said fill pump and said hydraulic fluid system to by-pass hydraulic fluid when the pressure in said fill hose exceeds a predetermined level.

11. The apparatus according to claim 6 further comprising a switch valve disposed between said suction pump and said one or more bleeder valve hoses and said suction hose to selectively switch between suctioning from said one or more bleeder valve hoses and said suction hose.

12. A method of using an apparatus for removing and replacing hydraulic fluid used in a hydraulic fluid system in a vehicle, comprising the steps of:

removing a cover from a vehicle brake master cylinder in the vehicle;

activating a vacuum pump to suction out hydraulic fluid from said vehicle brake master cylinder to a waste fluid tank using a suction hose connected to said waste fluid tank;

installing an adapter on said vehicle brake master cylinder, said adapter connected to a fill hose, said fill hose connected to a fresh fluid tank having a source of fresh hydraulic fluid for use in the vehicle;

activating a fill pump disposed between said fresh fluid tank and said fluid storage reservoir to fill said vehicle brake master cylinder with hydraulic fluid;

connecting a bleeder valve hose to a bleeder valve on the vehicle;

activating said vacuum pump to suction out hydraulic fluid from the hydraulic fluid system of the vehicle to said waste fluid tank;

disconnecting said bleeder valve hose from said bleeder valve and deactivating said vacuum pump; and deactivating said fill pump and removing said adapter from said vehicle brake master cylinder.

13. The method according to claim 12 further comprising the step of opening said bleeder valve prior to activating said vacuum pump to suction out hydraulic fluid from the hydraulic fluid system of the vehicle to said waste fluid tank.

14. The method according to claim 12, wherein said suction hose comprises a suction wand at one end of said suction hose for suctioning hydraulic fluid from said vehicle brake master cylinder.

15. The method according to claim 12 further comprising a by-pass valve disposed between said fill pump and said vehicle brake master cylinder to by-pass hydraulic fluid when the pressure in said fill hose exceeds a predetermined level.

16. An apparatus for removing and replacing hydraulic fluid used in a hydraulic fluid system in a vehicle, comprising:

a housing;

a fresh fluid tank in said housing for storing a source of fresh hydraulic fluid for use in the vehicle;

a waste fluid tank in said housing for receiving and storing a source of waste hydraulic fluid received from the vehicle;

a fill pump for dispensing hydraulic fluid from said source of fresh hydraulic fluid to the hydraulic fluid system in the vehicle through a fill hose interconnecting said fresh fluid tank and the hydraulic fluid system;

an adapter disposed between said fill hose and the hydraulic fluid system for removably connecting said fill hose to the hydraulic fluid system, said adapter having a vent for preventing air-lock in said hydraulic fluid storage reservoir, said vent configured to allow air to escape from said storage reservoir during dispensing of hydraulic fluid to the hydraulic fluid system;

a vacuum pump for suctioning hydraulic fluid from the hydraulic fluid system of the vehicle to said waste fluid tank through one or more bleeder valve hoses interconnecting the hydraulic fluid system and said waste fluid tank; and connection means at an end of each of said one or more bleeder valve hoses for removably connecting said one or more bleeder valve hoses to the hydraulic fluid system of the vehicle.

17. The apparatus according to claim 16 further comprising a suction hose connected to said vacuum pump for suctioning hydraulic fluid from the hydraulic fluid system to said waste fluid tank.

18. The apparatus according to claim 17, wherein said suction hose comprises a suction wand at one end of said suction hose for suctioning hydraulic fluid from the hydraulic fluid system.

19. The apparatus according to claim 17 further comprising a switch valve disposed between said vacuum pump and said one or more bleeder valve hoses and said suction hose to selectively switch between suctioning from said one or more bleeder valve hoses and said suction hose.

20. The apparatus according to claim 16 further comprising a by-pass valve disposed between said fill pump and said hydraulic fluid system to by-pass hydraulic fluid when the pressure in said fill hose exceeds a predetermined level.

21. The apparatus according to claim 16, wherein said adapter is sized and configured to sealably connect to said hydraulic fluid storage reservoir.

22. The apparatus according to claim 16, wherein said hydraulic fluid storage reservoir is a vehicle brake master cylinder and each of said one or more bleeder valve hoses removably connect to a bleeder valve on the vehicle.

* * * * *